Aug. 28, 1962 P. O. DAHLMAN 3,051,792
SELECTIVE PARTY LINE SIGNALING SYSTEM
Filed Jan. 22, 1957
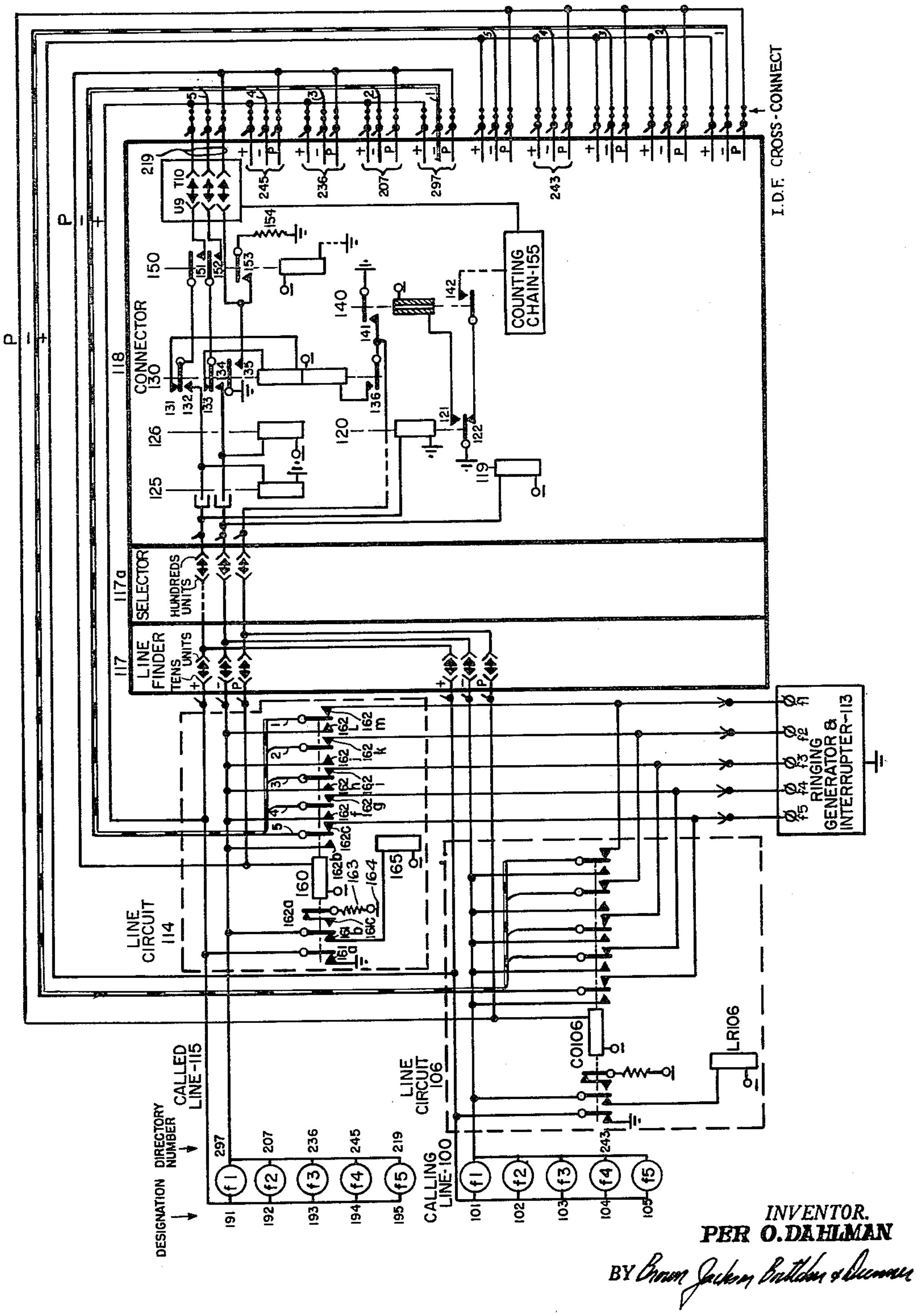
INVENTOR.
PER O. DAHLMAN
BY Brown, Jackson, Boettcher & Dienner 3,051,792

SELECTIVE PARTY LINE SIGNALING SYSTEM

Per O. Dahlman, Galion, Ohio, assignor to North Electric Company, Galion, Ohio, a corporation of Ohio Filed Jan. 22, 1957, Ser. No. 635,276
5 Claims. (Cl. 179—17)

The present invention relates to automatic telephone systems, and particularly to an automatic telephone system in which the subscriber substations are connected in the exchange on a terminal-per-station basis.

An automatic telephone system basically consists of a series of automatic switches which are operative in response to the dialing of a directory number by a calling subscriber to extend a connection to the particular subscriber indicated thereby. More specifically, the exchange incorporates a plurality of "final terminal sets," each of which sets is assigned a predetermined directory number, and the switching equipment in its operation selects the particular "final terminal set" indicated by the incoming directory number.

The manner in which the desired subscriber on the line is then signalled is dependent upon the particular pattern of connection of the subscriber substations to the lines. More specifically, in a terminal-per-line arrangement, each line in the exchange is connected to one final terminal set which is assigned thereto, and the switching equipment reaches all of the subscriber substations on the line over such terminal. Since each of the stations is accessed over a common terminal set, it is apparent that all of the stations connected to such line must have that portion of the directory number assigned to such terminal set. Such arrangement is therefore inherently inflexible in that movement of a subscriber substation from one line to another requires a corresponding change in the directory number of such subscriber. Further, the fact that the stations do not have individual final terminal sets renders the interception of vacant and vacated party numbers somewhat prohibitive from the standpoint of economy.

As a result of the inherent shortcomings of such arrangement—and the recent growth of operator and customer toll dialing—there has been an increased use of the so-called terminal-per-station pattern. In the so-called terminal-per-station arrangement each subscriber substation in the exchange has an individual final terminal set which is accessible to the switching equipment, and each subscriber substation is therefore assigned the directory number of the individual terminal set to which it is connected. In an exchange having such pattern, a party line (one having a number of subscribers connected thereto) will be connected to the different terminal sets which are assigned to the parties thereon.

Obviously, in such arrangement a station may be associated with any line, and may be moved from an individual line to a party line or vice versa, without change of the directory number since the directory number is individual to the substation. These and other advantages including the manner in which an increased percentage of call completion is achieved; the resultant increase in main station capacity for a given number of digits in telephone numbers; the reduced cost of call interception; the improvement of local service from call interception; and others, have resulted in increased interest in such pattern.

In a telephone system connected as a terminal-per-station exchange according to one prior art arrangement, the final terminal sets are accessed over five different types of connectors, each connector being adapted to transmit one of five different ringing frequencies. As the directory number is transmitted by the calling party, the switching equipment examines the hundreds digit of the called party number and then selects the particular connector which is capable of transmitting the signalling frequency required to signal the particular subscriber on the line indicated by the hundreds digit. The shortcoming of such arrangement, of course, exists in the expense involved in providing the special connector equipment which is required to provide such facility.

In a second prior art arrangement, the digits of the called number and the ringing frequencies to be applied bear no relation, and instead, in such arrangement each final terminal set consists of four connecting points identified respectively as the positive, negative, P-wire, and ringing terminals. The ring terminal in the final terminal set for each substation is connected to the particular one of the frequency generators to which the associated substation is responsive, and as the terminal is selected, the predetermined ringing signal for such terminal set is automatically applied over the ring terminal to the positive side of the called subscriber line. Such arrangement requires an extremely large number of connecting points for the fourth wire ringing conductors in the connectors, as the ringing conductor for a particular station must be multiplied to all connectors through which the station can be reached.

It is an object of the present invention to minimize the equipment required in the provision of a terminal-per-station arrangement, and particularly in the connecting terminal sets in the connector equipment. Fundamentally such object is achieved by eliminating the fourth wire ringing connection terminal for each final terminal set in the connector, and utilizing the line circuit cut-off relay of the called party line to connect the negative conductor terminal of such set for use in both the ringing and speech transmission functions. As will become apparent from the following description, the number of contact sets for ringing required according to the arrangement of the present invention is minimized as the ringing conductor is terminated in a single connection at the line cut-off relay and is not multiplied independently to all the connectors.

The features of the present invention which are believed to be novel are set forth with particularity in the appended claims, and the invention, together with further objects and advantages thereof, may best be understood by reference to the following description taken in connection with the accompanying drawing.

More specifically, with reference to the FIGURE, there is shown thereat in schematic and block form an automatic telephone system including switching equipment for extending connections between a plurality of subscriber lines, such as represented by the calling subscriber line 100 and the called subscriber line 115. Party line 100, as illustrated, serves five subscriber substations 101–105, each of which includes a frequency responsive unit, such as *f*1–*f*5, the different frequency responsive devices at the different stations being responsive to correspondingly different frequencies. The called party line 115 is likewise illustrated as serving five subscriber substations 191–195, each of which has an individual frequency responsive device, the ringing device at the different substations on the called line being likewise responsive to the correspondingly different ringing frequencies *f*1–*f*5.

Each subscriber line, such as calling line 100, has access over an associated line circuit, such as 106, to a plurality of linefinders, each tied to an associated selector, such as illustrated selector 117*a*. The selectors have access over the various levels to groups of connectors and trunks. One such connector reached by registration of digit "2" in the selector is connector 118, the connector 118 having a plurality of final terminal sets designated by called directory numbers, such as 219, 245, etc., accessible thereto, each of which terminal sets is connected to, and associated with, a preassigned substation on a called line, in the manner of terminal set 219 and substation 195 on called line 115.

Thus subscriber line 106, designated in the following exemplary connection as the calling line, is connected for use with the linefinders (ↄ indicating multiples), and is also multipled to the terminal sets of connectors through which stations on line 106 may be reached, such as terminal set 243. Subscriber line 115, designated as the called line in the example, extends to the linefinders and is also multipled to the terminal sets of connectors through which stations on line 115 may be reached, such terminal sets being 219, 245, 236, 207, and 297.

According to a novel concept of the invention, ringing equipment, such as ringing generator and interrupter 113, for selectively signalling the called party on the line is connected for access by the connectors, such as connector 118, over the negative terminal of the final terminal set of the called party, such as called party terminal set 219, and its associated line circuit, such as line circuit 114 for called line 115. In a similar manner, the negative terminal for each different terminal set, such as 219, 245, 236, 207, 297, for a multiparty called line, such as called line 115, is connected over the line relay contacts 162*c*, 162*g*, etc., for the line to a different ringing frequency, such as *f*5–*f*1, respectively. Thus the connections between the negative wire of the called line 115 having associated substation 191–195, extend to the final terminal sets in the connectors for such substations by way of control contact sets on the cut-off relay, such as 160, in the line circuit, such as 114, for the called line and over conductors 1–5, the portion of the conductors which extends from the contacts on relay 160 to the connector terminals 219, 245, etc., being cabled as shown in FIGURE 1 (Cable —). The conductors leave the cable (—) as indicated by the numerals 1–5 located adjacent the connector terminals 219, 245, etc. As shown more fully hereinafter, the cut-off relay and connector operate to first complete a ringing circuit over the positive and negative conductors of the called line to the desired substation, and thereafter to complete a connection between the calling and called parties over the same terminals. The positive, negative, and P-wires (i.e. test, private or third wires) of the subscriber lines are multipled to all linefinders, and the connector terminals +, —, and P for the substations on the subscriber lines are multipled to all connectors in the group of connectors reached from the same selector link. A cross-connect I.D.F. is indicated on the right side of the connector multiples, which multiples enable any connector called terminals to be cross-connected to any line and available frequency on that line.

Assuming now that the subscriber at substation 104 which is connected to calling line 100 desires to extend a connection to the subscriber at substation 195 which is connected to line 115, the calling subscriber removes the receiver from the base of the substation set 104 to effect the seizure of associated line circuit 106, operating line relay LR106 over the path from negative battery through the winding of line relay LR106, break contacts of the I type of cut-off relay CO106, negative wire through the calling substation loop positive wire, other break contacts of the I type of relay CO106 to ground. The line circuit 106 (shown schematically in the drawings and described more fully hereinafter) operates in the conventional manner with the assistance of guard and allotter circuits (not shown) to effect seizure of an idler linefinder-selector combination, such as illustrated combination 117–117*a*, and the linefinder 117 extends a connection to the associated selector switch 117*a* in a conventional manner. The calling party at substation 104 then dials the first digit 2 of the called number 219 and as a result thereof, the selector selects an idle connector, such as illustrated connector 118, on the "2" level, and completes an operating circuit for line relays 119, 120 thereat over the calling line loop.

Line relay 120 operates, and at its contacts 121 completes an obvious operating circuit for link hold relay 140 of the slow release type. Link hold relay 140 operates and at its contacts 141 connects ground to the incoming P-wire (i.e. private or third wire) which extends back over the selector 117*a* and linefinder 117, and the P-wire of the calling line to the cut-off relay in line circuit 106. The line circuit cut-off relay CO106 operates to release the line relay LR106 and in turn the guard circuit in the conventional manner, and effects other circuit conditioning operations at its contacts which are without effect at this time. Relay 140, at its make contacts 142, also prepares a circuit to the counting chain.

As the calling subscriber at substation 104 now dials the digits 19 of the directory number 219 assigned to the called substation, the impulses are transmitted over the connection extending from the calling party substation 104 to the connector line relays 119, 120 to effect the pulsing thereof. Line relay 120 at its contacts 122 effects the advance of the counting chain 155 over an obvious circuit in the conventional manner, link hold relay 140 being slow-to-release and therefore remaining in the operated condition for the series of the pulses representing each digit.

The counting chain 155 in response to the received digits "19" of the called number 219 effects operation of the first tens relay T10 and the ninth units relay U9 in the connector 118 of the seized link, and the operated tens and units relays, in turn effect extension of the connection to the terminal set 219. The connector operation, as thus described, is conventional in the art.

With the release of the connector transfer relay (not shown) following termination of receipt of the units digit "9," the control relay 150 operates, and at its contacts 153 completes an operating circuit for the line cut-off relay 160 in the line circuit 114 of the called party, the circuit extending from negative battery over the winding of cut-off relay 160, a common terminal P for the called line 115, the cross connect to the terminal P of the final terminal set 219 for the substation 195, the closed contacts of the tens relay T10 and the units relay U9, contacts 153, resistor 154 to positive battery. Connector relay 150 at its contacts 151, 152 prepares a point in the ringing circuit for the called line 115.

Cut-off relay 160 operates through its first step to effect the opening of break contacts 161*a* and 161*b* and the resultant disconnection of the line relay 165 from the line in preparation for ringing, and at its make contacts 161*c* connects ringing return battery 164 over resistance 163 and contacts 162*a* to the negative wire of the called line 115 to thereby complete the ringing circuit to the substation 195 having directory number 219 on called line 115 and to operate the "frequency 5" responsive ringing device thereat, the circuit extending from the ringing interruptor terminal 5 over contacts 162*c*, conductor 5, cable, conductor 5 which is the negative conductor of final terminal set 219, closed contacts of tens relay T10 and units relay U9, contacts 152, 133, upper winding of relay 130, contacts 131, 151, closed contacts of units relay U9 and of tens relay T10, positive terminal of final terminal set 219, the positive conductor of called line 115 to the frequency responsive device f5 of substation 195 connected thereto, the negative conductor of called line 115, contacts 161*c*, 162*a*, resistor 163 to negative battery 164, through the battery to the grounded positive pole and through the ringing interrupter to frequency 5 terminal. Since only frequency responsive unit f5 on the called line 115 responds to frequency signal f5, only substation 195 will be signalled. The resistance of the described ringing circuit is of a value which prevents operation of the connector relay 130, the designator 195 identifying the circle representing the substation and f5 within the circle designating the frequency of the ringer thereat.

In the present example, it was assumed that directory number 219 was dialled to extend a call over terminal set 219 to substation 195. Since only ringing frequency conductor f5 is connected to the negative terminal of terminal set 219, the closure of connector relay contacts U9–T10 to select terminal set 219 (in the exemplary connection) effects connection of ringing frequency f5 alone to the called line 115.

It is apparent that if the directory number 245 had been dialled to reach substation 194, the fourth tens relay T40 and the fifth units relay U5 would have operated to select terminal set 245 in the extension of the connection to line 115. Since ringing frequency f4 alone is connected to the negative terminal of terminal set 245 (and no path is completed over the other terminal sets 219, etc., by the connector tens and units relays) only frequency signal f4 is coupled to the called line 115 when a call is being extended to substation 194 on called line 115.

As the called party answers, a low resistance circuit is placed across the called line 115 at the substation 195 to thereby complete a circuit having a resistance value which effects the operation of the connector relay 130. As relay 130 operates it is effective at its contacts 131, 133 to interrupt the ringing circuit for the called line; at its contacts 132, 134 connects the called line loop to the windings of connector relays 125 and 126 in series to thereby prepare for the operation of connector relays 125 and 126 which also furnish called talking battery; and at its contacts 136 completes an obvious self-holding circuit to ground and at its contacts 135 connects direct ground to the cut-off relay 160 to effect the operation thereof through its second step. That is, with the second step operation of cut-off relay 160 it is effective to operate contacts **162*a*–162*m*, and in such operation effects the interruption of the ringing circuit and transfer of the final terminal set negative wire connections from the ringing interrupter to the called line, such transfer for substation 195 for example being effected at contacts 162*b*, 162*c* of the cut-off relay 160**.

With the operation of cut-off relay 160 and the closure of contacts **162*b*, the series circuit for the connector relays 125 and 126** is completed and the operation thereof is effected.

Conversation can now take place between the subscribers. Following completion of the conversation and restoration of the handsets by the called and calling parties the equipment restores to normal. Briefly, if the called party restores the handset to the substation first, the holding circuit for the connector relays 125 and 126 is interrupted and these relays release. As the calling party subsequently returns the receiver to the substation, the connector line relays 119, 120 restore, in turn interrupting the holding circuit for link hold relay 140. Link hold relay 140 restores, and at its contacts effects release of relay 130 and the other link relays. As relays 130, 150, U9 and T10 restore, they are effective at their opened contacts to remove the ground from the P-wire for the called party line circuit to effect the release of the cut-off relay 160 thereat.

It is apparent from the foregoing description that the connection of the final terminal sets 245, 236, 207, and 297 are controlled in their connection to the called line 115 by cut-off relay 160 in the manner similar to that described above.

In the fourth wire prior art arrangements previously mentioned, for a given station there must be fourth wire contacts in each connector; whereas the present arrangement requires contacts only on the line cut-off relay. In that ten to fifteen connectors are used in a group, the economy of the present arrangement is readily appreciated.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. In an automatic telephone system, a plurality of subscriber lines, each of which has an individual line circuit and at least one substation connected thereto, switching equipment including at least a connector switch, a plurality of final terminal sets connected for use by said connector switch in extending connections between the substations on the different subscriber lines, each terminal set being assigned for use in extending connections to only one preassigned substation, different sets being assigned for use with different substations; switching means connected in the line circuit for each subscriber line operative responsive to the selection of its associated line by said connector switch to close a ringing circuit to the line including two of the final terminals of its associated terminal set, and means operative responsive to answer by the called party to control said switching means in the line circuit to interrupt said ringing circuit and to close a talking circuit from the calling substation over said two terminals to its associated substation.

2. In an automatic telephone system, a plurality of subscriber lines, each having an individual line circuit and at least one substation connected thereto, switching equipment including at least a connector switch, a plurality of final terminal sets connected for use by said connector switch in extending connections between the substations on the different subscriber lines, each terminal set being assigned for use in extending connections to only one preassigned substation, different sets being assigned for use with different substations; switching means connected in the line circuit for each line operative at times to complete a ringing path for applying a signalling frequency to a substation over two of the final terminals associated with said substation, and operative at other times to close a speech path over said two terminals from the calling substation to the called substation, and means for connecting a third terminal of each terminal set for use by the connector switch in the control of the line circuit switching means to the establishment of the ringing and speech paths to the desired substation.

3. In an automatic telephone system having a source of signal frequencies for ringing purposes, a plurality of subscriber lines, each having an individual line circuit including a line cut-off relay and at least one substation connected thereto, switching equipment including at least a connector switch, a plurality of final terminal sets connected for use by said connector switch in extending connections between the substations on the different subscriber lines, each terminal set being assigned for use in extending connections to only one preassigned substation, different sets being assigned for use with different substations; switching means connected to operate said line cut-off relay which is connected in the line circuit of the called line responsive to seizure of the final terminal set for its associated substation by said connector switch, and means controlled by said line cut-off relay in its operation to complete a path from said signal frequency source to its associated substation over two of the final terminals associated with said substation, and means in said connector switch operative to thereafter control said line cut-off relay in the line circuit for the called substation to interrupt the ringing path and to close a voice transmission path which extends from the calling substation to the called substation over said two terminals.

4. In an automatic telephone system, a plurality of subscriber lines, each having an individual line circuit and at least one substation connected thereto, switching equipment including at least a connector switch, a plurality of final terminal sets connected for use by said connector switch in extending connections between the substations on the different subscriber lines, each terminal set comprising only a positive, a negative and a third wire terminal and being assigned for use in extending connections to only one preassigned substation, different sets being assigned for use with different substations; and switching means including a cut-off relay in the line circuit for each line operative to complete a path for applying a ringing frequency to a substation over two of the final terminals associated with said substation, means for connecting the third wire terminal of each terminal set for a substation on a line to control operation of the switching means for its line circuit responsive to seizure of the set by a connector switch, and means controlled by said switching means thereafter to interrupt the said ringing path and to extend a speech transmission path over said two terminals from the calling substation to the called substation.

5. In an automatic telephone system, a plurality of subscriber lines, each having an individual line circuit and at least one substation connected thereto, switching equipment including at least a connector switch, a plurality of final terminal sets connected for use by said connector switch in extending connections between the substations on the different subscriber lines, each terminal set comprising only a positive, a negative and a third wire terminal and being assigned for use in extending connections to only one preassigned substation, different sets being assigned for use with different substations; and switching means in the line circuit for each line including a cut-off relay, contact means on said cut-off relay for normally extending a ringing circuit over the negative terminals toward each substation on the line, different frequencies being applied to the different negative terminals for the different substations on each line; means in the connector switch for connecting the third wire terminal of each terminal set for the line to control its associated cut-off relay to complete a ringing circuit over its positive and negative terminals responsive to seizure of the set by a connector switch, and means in said connector switch operative to control said cut-off relay to interrupt the connection of the ringing paths to the negative terminals, and to connect the negative terminals to the called line responsive to answer by the called party.

References Cited in the file of this patent

UNITED STATES PATENTS

| | | |
|---|---|---|
| 2,403,877 | Powell | July 9, 1946 |
| 2,490,054 | Hatton | Dec. 6, 1949 |
| 2,717,925 | Lomax | Sept. 13, 1955 |
| 2,839,609 | Leonard | June 17, 1958 |